United States Patent Office 3,146,618
Patented Sept. 1, 1964

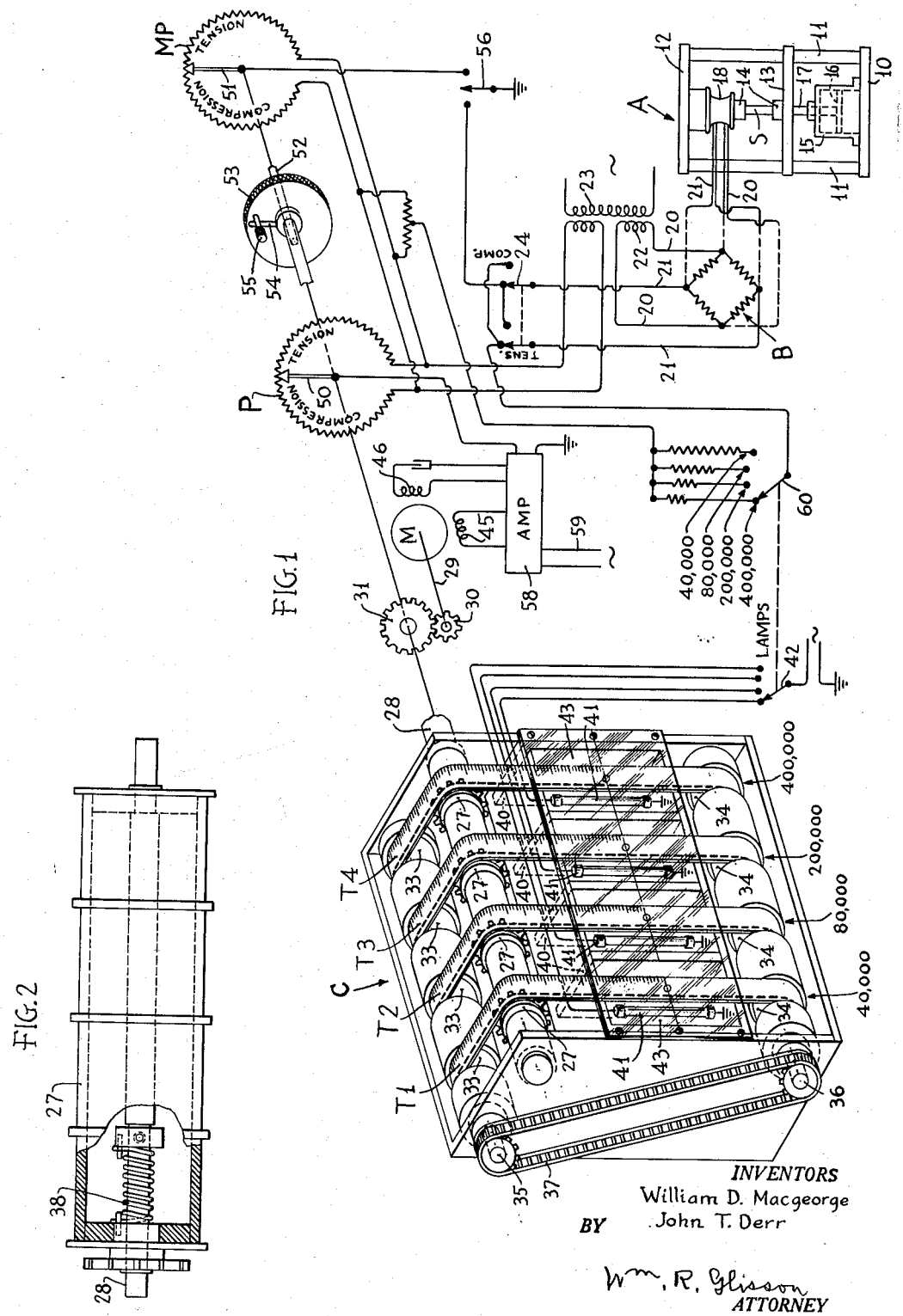

3,146,618
MULTI-RANGE MAXIMUM LOAD INDICATOR
William D. Macgeorge, Berwyn, and John T. Derr, Ambler, Pa., assignors, by mesne assignments, to Tinius Olsen Testing Machine Co., Willow Grove, Pa., a corporation of Pennsylvania
Filed July 18, 1960, Ser. No. 43,504
3 Claims. (Cl. 73—88.5)

This invention relates to a multi-range maximum load indicator for specimen testing machines and has for an object the provision of improvements in this art.

Another object is to provide simple and convenient means for setting an indicator at the maximum load at which a specimen breaks with means for subsequently returning the indicator to the maximum load setting and thereafter returning it to zero ready for another test.

Another object is to provide a plurality of tape indicators for different load ranges together with means for changing the rate of tape movement for each range and means for making the selected tape prominent for reading.

Another object is to provide means for driving tapes to keep them taut at all times regardless of the wound size on take-up rolls.

The above and other objects will be apparent from the following description of an exemplary embodiment, reference being made to the accompanging drawings, wherein:

FIG. 1 is a diagrammatic view of the apparatus and circuit; and

FIG. 2 is an axial section through one of the tape take-up rolls.

A testing machine A, of a simple exemplary form, has a base 10, columns 11, a fixed head 12, a crosshead 13 slidable along the columns, specimen grips 14 for a specimen S, power means for operating the crosshead for tension or compression loadings, including a cylinder 15, a piston 16 therein, and a piston rod 17, and a load cell or load responsive device 18 of the resistance strain gage type.

The resistance strain gage means of the load cell 18 are indicated as being a bridge B with input leads 20 and output leads 21. These leads 20, 21 and the bridge B are duplicated in the wiring diagram which is included in the same figure for simplicity. Input power is shown to be supplied from the secondary coil 22 of a transformer primary 23. Smoother operation is obtained by using D.C. current here and at some other parts of the circuit, this conveniently being rectified A.C., but it is not necessary to show circuit refinements here. In the output leads 21 a reversing switch 24 is provided for use when switching from tension to compression testing.

An indicator or load indicating device C is provided for showing the load registered by the output leads 21 of the load cell, the indicator here comprising a plurality of tapes T1, T2, T3 and T4 for different load ranges. For example, as indicated by legends, tape T1 may be used for the range from 0 to 40,000 lbs.; tape T2 from 0 to 80,000 lbs.; tape T3 from 0 to 200,000 lbs.; and tape T4 from 0 to 400,000 lbs.

The tapes are all driven by sprocket drums 27 on a common shaft 28, the shaft 28 being driven by a servomotor M which is responsive in action on a specimen to the load cell output. Diagrammatically the motor M is shown as having a shaft 29 with a gear 30 which drives a gear 31 fast on shaft 28.

The tapes travel from the drive drums 27 to take-up drums on either side. The take-up drums on the upper side are designated by the numeral 33 and those on the lower side as 34. The drums 33 and 34 are carried by shafts 35 and 36 respectively which are caused to turn together as by sprockets and a chain 37.

In the diagram the tapes are shown as being separate bands for clarity of illustration but since they all travel together in unison they can be formed together on a single wide sheet of transparent material. "Mylar" has been found to be one material, a plastic, which is suitable for this purpose. The take-up drums, instead of being separate, may then be made as long rolls to take the wide tape band. FIG. 2 shows a section of one roll with a torsion take-up spring 38 to keep out slack and accommodate for varying diameter of band wound thereon. The spring 38 is only needed for one of the take-up rolls but if provided for both rolls 33 and 34, will of course, pull in opposite directions away from the drive drums 27, which likewise may be made as a single roll. If the take-up springs 38 had enough length and turns, like the long springs of window shade rollers, they could alone take care of all take-up and the common drive belt chain 37 could be omitted.

For each range tape there are provided means for making prominent and distinctive the tape which is being used at any particular time. As here shown, these means comprise partitions 40 between bands forming compartments behind them in which lamps 41 are mounted. The lamps are in circuit with a selector switch 42 which cuts in the lamp behind the tape which is in use.

Over or under each tape a transparent shield 43 is placed carrying a registry line. Marking on the tapes indicate the amount of load above the zero point.

The servo motor M is diagrammatically indicated to have field coils 45 and 46 supplied by a steady current and a current which is dependent on paired balancing variable factors. During a test the variable factors are the output resistance of the bridge B on the one hand and the output through a first load registering device in the form of a potentiometer P on the other hand. A contact arm 50 driven by the shaft 28 moves over the resistance coil of the potentiometer P until the current matches or balances that of the bridge caused by the load, whereupon the motor M will stop in the position into which it has been caused to move.

Means are provided for preserving and re-exhibiting the maximum load indication at which a specimen is loaded, usually at breakage, because there is not time to make an accurate reading of the tape indicator at this time. These means here comprise a maximum-setting second load registering device in the form of a potentiometer MP with a contact arm 51 which is driven by a shaft 52 attached to a knurled disk 53. Shaft 52 is coaxial with but separate from shaft 28 and shaft 28 drives shaft 52 in one direction by an arm 54 on shaft 28 and a pin 55 carried by knurled disk 53. Since the arm 51 of potentiometer MP will be held by friction at any point to which it is driven it will be left at the furthest point to which it was moved. After the specimen breaks or the load on the speicmen is removed the motor M will reverse and return the tapes to zero position.

To re-exhibit the maximum load reading, the bridge and load cell are cut out of circuit and the potentiometer MP substituted in their place. This is done by a selector switch 56 which is moved from its left contact to its right contact. This matches the resistance of P with that of MP, instead of bridge B, and when the point where arm 51 of MP has been set is reached, the motor will stop to allow the tape indication at that point to be read. After the reading has been recorded switch 56 is moved back to allow the motor to return the tapes to zero position, after which the knurled disk 53 can be turned back to carry the arm 51 of MP back to its initial position.

The comparator circuit includes an amplifier 58 supplied with current by power leads 59.

Means are provided for selecting the load range of the comparator circuit, the means here comprising a selector switch 60 with a plurality of contacts and different resistances of suitable values for the load ranges desired so that the tape will move the same distance for any range selected.

Switch 60 is ganged with lamp selector switch 42 so that the lamp behind the tape for the selected range will be automatically lighted and the other lamps left unlighted.

It is thus seen that the invention provides simple and convenient means for selecting and making prominent indications of various load ranges and for setting and repeating maximum load indications.

While one embodiment of the invention has been specifically illustrated and described it is to be understood that there may be various embodiments and modifications within the general scope of the invention.

What is claimed is:

1. A device for indicating the load applied to a test specimen by a testing machine comprising in combination,
   (a) a load cell having a strain gage output circuit responsive to the load being applied to a test specimen,
   (b) a load indicating scale device,
   (c) a servo motor mechanically coupled to drive said load indicating scale device,
   (d) switch means,
   (e) a field coil of said servo motor electrically connectable by said switch means to said strain gage output circuit,
   (f) a first load registering potentiometer mechanically coupled to said servo motor and electrically connected to said field coil of said servo motor, said first load registering potentiometer being positioned by said servo motor in response to said load applied to said test specimen,
   (g) a second load registering potentiometer electrically connectable to said field coil by said switch means and mechanically coupled to said servo motor by a one-way drive to retain a maximum load indicating position, said switch means connecting either said strain gage output circuit or said second load registering potentiometer output circuit to said field coil whereby a load being applied to a test specimen is exhibited on said scale device when said strain gage output circuit is connected to said field coil and the maximum load applied to said test specimen during a testing operation is re-exhibited on said scale device when said second load registering circuit is connected to said field coil,
   (h) and a voltage source for energizing the first and second potentiometers and the strain gage output circuit.

2. A device for indicating the load applied to a test specimen by a testing machine comprising in combination,
   a load cell having a strain gage output circuit responsive to the load applied to a test specimen,
   multi-range load indicating scales connected to a common drive shaft,
   a servo motor mechanically coupled to said drive shaft for positioning said multi-range load indicating scales,
   switch means,
   field coil means of said servo motor electrically connectable by said switch means to said strain gage output circuit,
   a first load registering potentiometer mechanically coupled to said drive shaft and electrically connected to said field coil means of said servo motor, said first load registering potentiometer being driven by said servo motor through said drive shaft to decrease excitation in said field coil means,
   a second load registering potentiometer mechanically coupled to said drive shaft by unidirectional drive means, said second potentiometer having an output circuit connectable to said field coil means by said switch means,
   and a voltage potential source connected to said switch means, said switch means connected to either said strain gage output circuit causing said multi-range indicating scales to be driven by said servo motor to indicate the load being applied to said test specimen or connected to said second load registering potentiometer to re-exhibit the maximum load indicated by said multi-range indicating scales.

3. A multi-range device for indicating the load applied to a test specimen by a test machine and re-exhibiting the maximum indicated load after testing comprising in combination:
   (a) a plurality of scales or exhibiting readings of the load being applied to said test specimen during testing,
   (b) servo motor means mechanically coupled to said scales for exhibiting said readings of the load applied to said test specimen,
   (c) a positioning field coil in said servo motor adapted to induce rotation of said servo motor,
   (d) a resistance type load responsive strain gage means in said test machine,
   (e) a strain gage output circuit electrically connectable between said load responsive strain gage means and said field coil, said output circuit transmitting an output voltage in response to the load applied to said test specimen,
   (f) a first load registering potentiometer having a voltage adjustment shaft mechanically coupled to said servo motor and having a first voltage output circuit electrically connected to said field coil in voltage opposition to said strain gage output circuit,
   (g) a second load registering potentiometer having a voltage adjustment shaft mechanically coupled to said servo motor through a one way drive connection and having a second output circuit electrically connectable to said field coil of said servo motor,
   (h) and switch means for electrically disconnecting said strain gage output circuit from said field coil after load testing a specimen, and electrically connecting to said field coil said second output circuit of said second load registering potentiometer, whereby a maximum load exhibited on said scales is re-exhibited by substituting said second load registering potentiometer output circuit for said strain gage output circuit.

References Cited in the file of this patent

UNITED STATES PATENTS

| | | |
|---|---|---|
| 1,987,857 | Lewis | Jan. 15, 1935 |
| 2,084,217 | Quintaville | June 15, 1937 |
| 2,547,926 | Cook | Apr. 10, 1951 |
| 2,804,041 | Neugass | Aug. 27, 1957 |
| 2,808,721 | Strimel | Oct. 8, 1957 |
| 2,812,229 | Strimel | Nov. 5, 1957 |
| 2,883,617 | Lathrop | Apr. 21, 1959 |
| 2,885,639 | Tewksbury et al. | May 5, 1959 |
| 3,022,663 | Diddens | Feb. 27, 1962 |

OTHER REFERENCES

Article entitled, "Production and Tensile Testing of Strain-Free Metal Specimens," by Greetham et al., from Journal of Scientific Instruments, vol. 37, May 1960, pp. 160–162.